Sept. 27, 1932.　　　I. SIKORSKY　　　1,879,717
PNEUMATICALLY OPERATED AND CONTROLLED AIRCRAFT
Filed June 15, 1929　　11 Sheets-Sheet 3
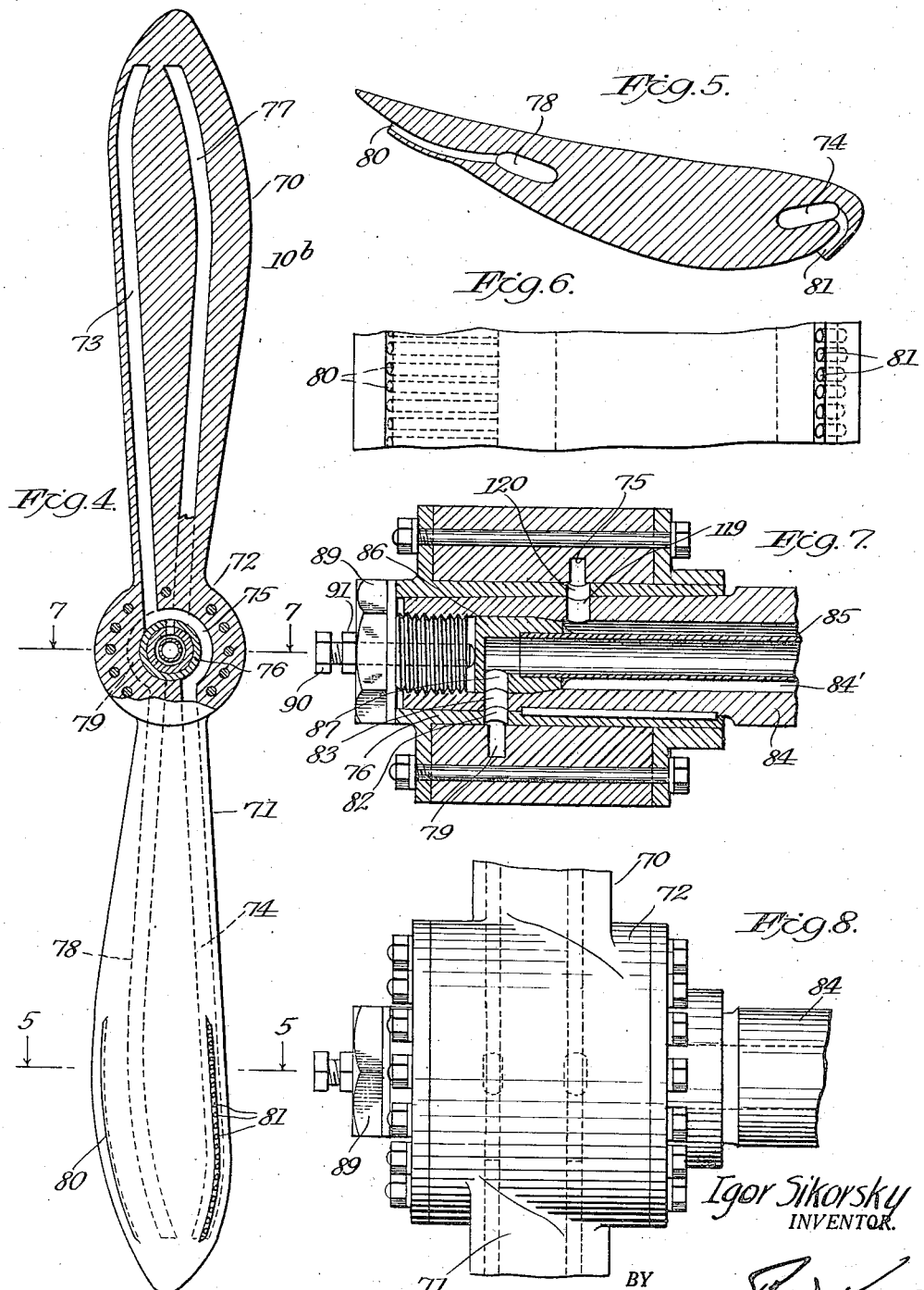

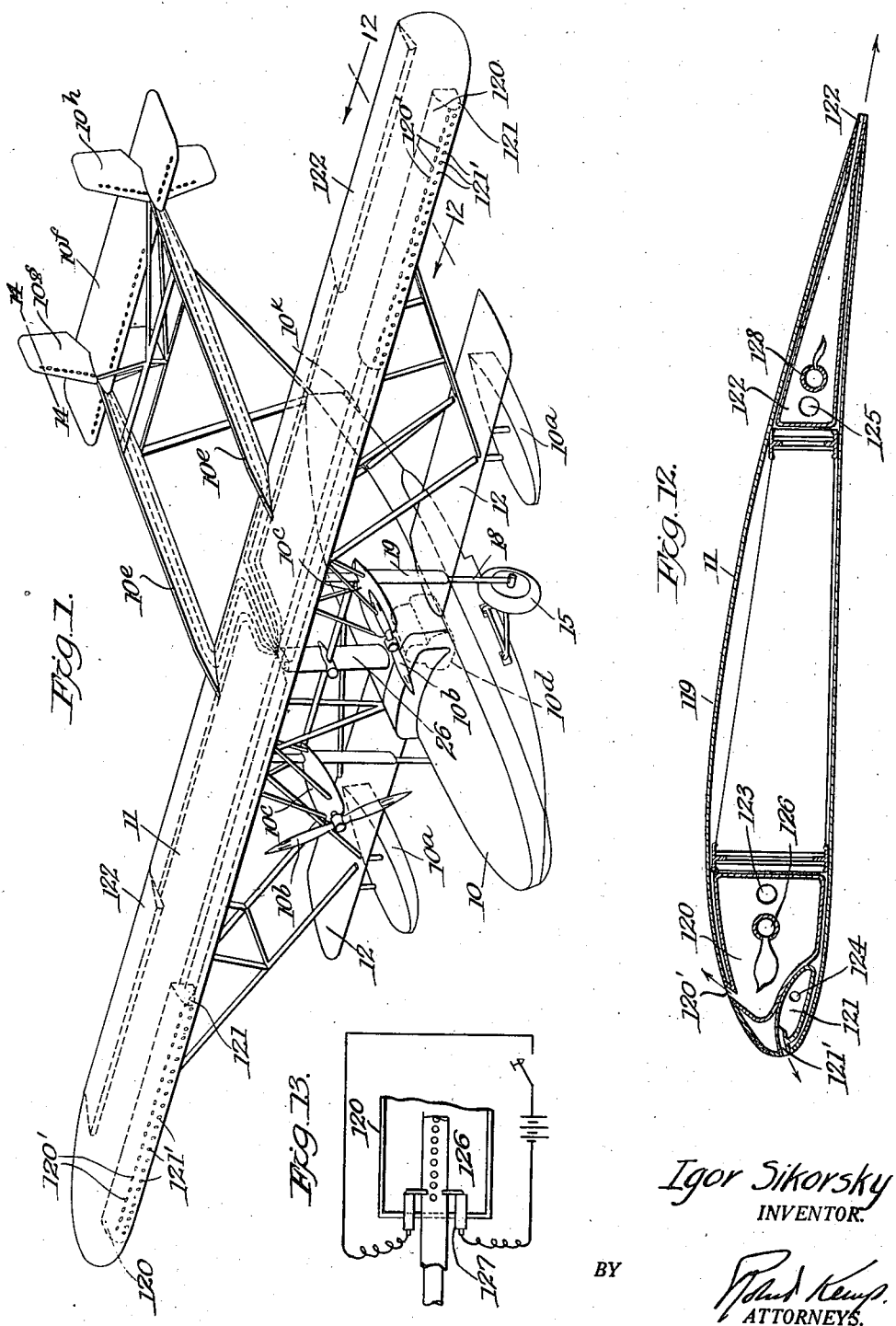

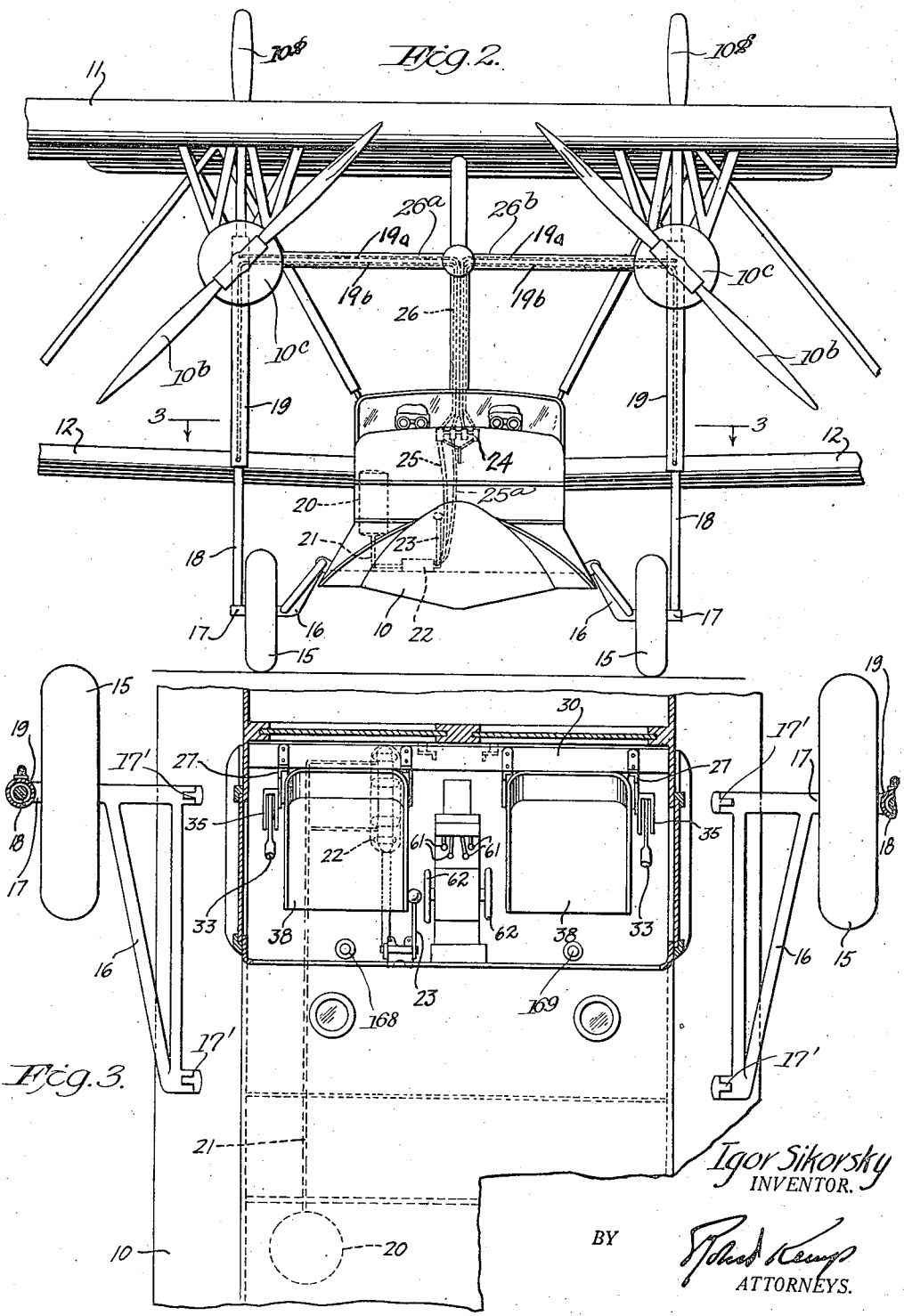

Sept. 27, 1932.   I. SIKORSKY   1,879,717
PNEUMATICALLY OPERATED AND CONTROLLED AIRCRAFT
Filed June 15, 1929   11 Sheets-Sheet 4
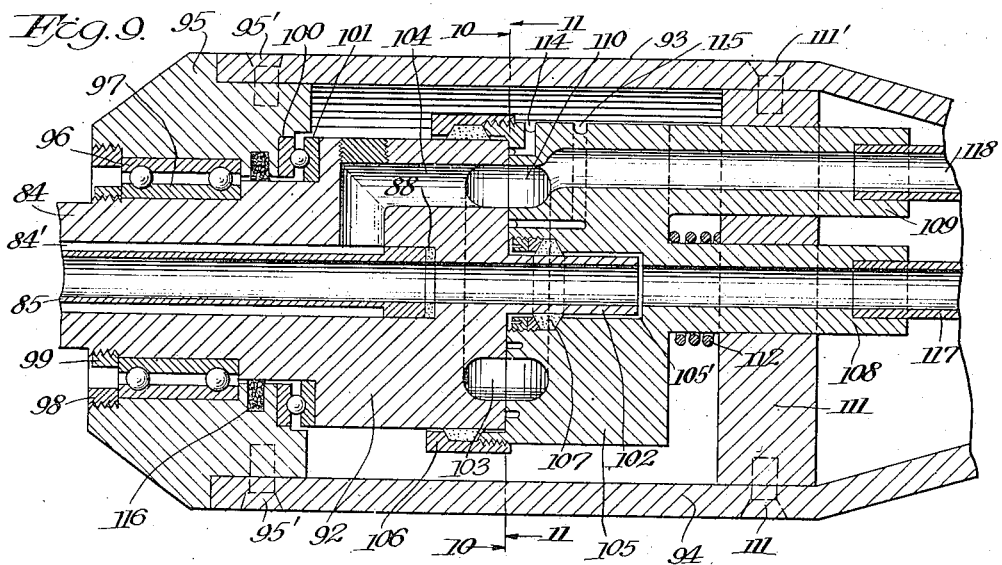
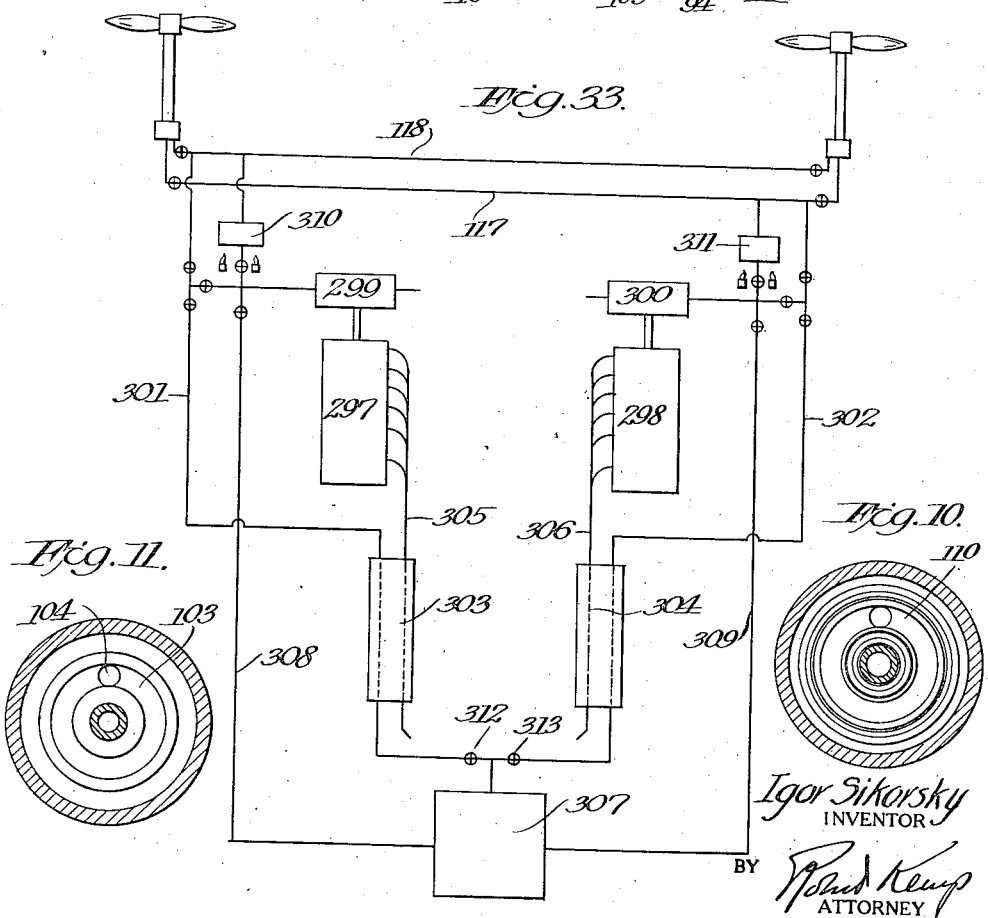
Igor Sikorsky
INVENTOR
BY
ATTORNEY

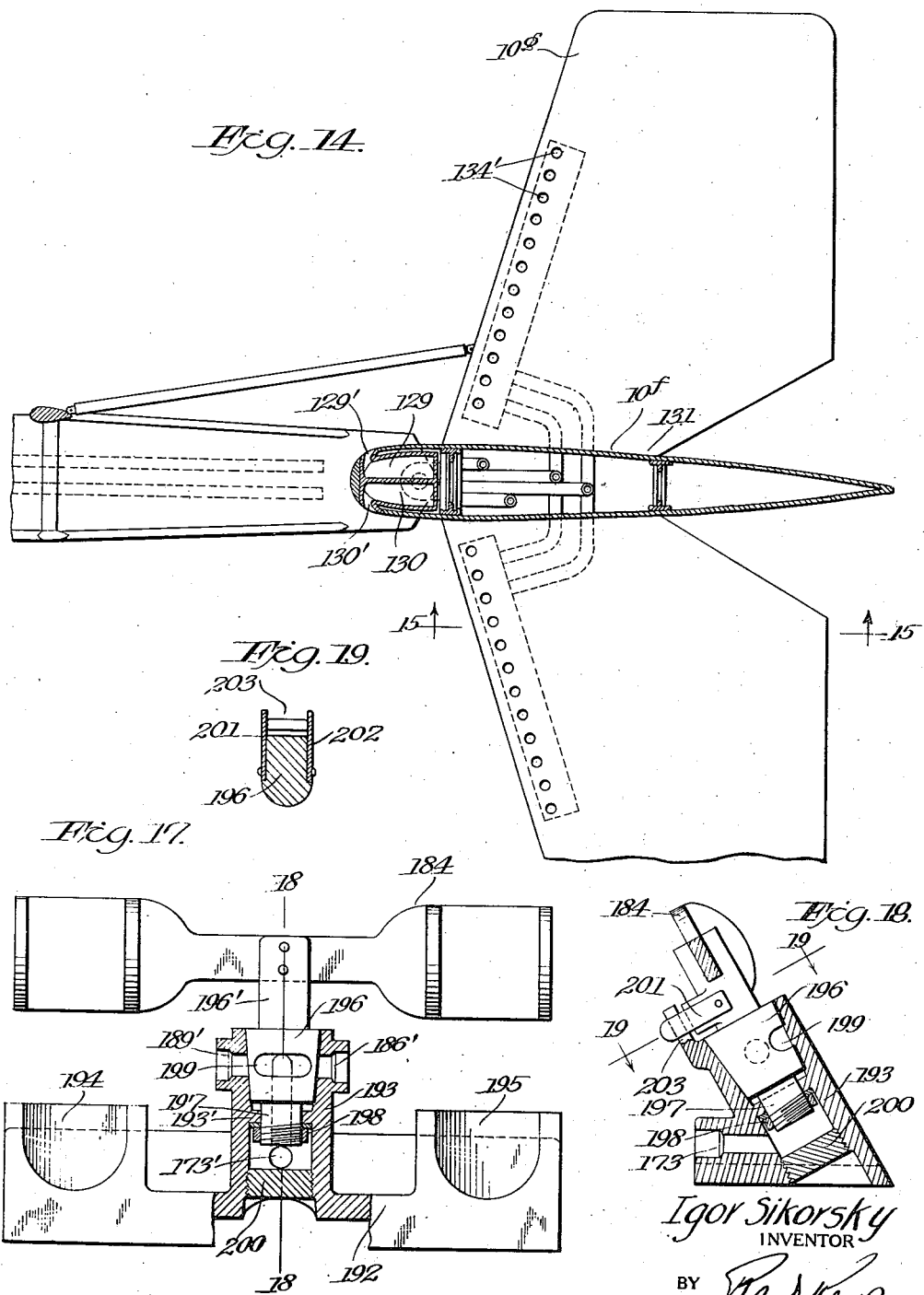

Sept. 27, 1932.　　　I. SIKORSKY　　　1,879,717
PNEUMATICALLY OPERATED AND CONTROLLED AIRCRAFT
Filed June 15, 1929　　11 Sheets-Sheet 6
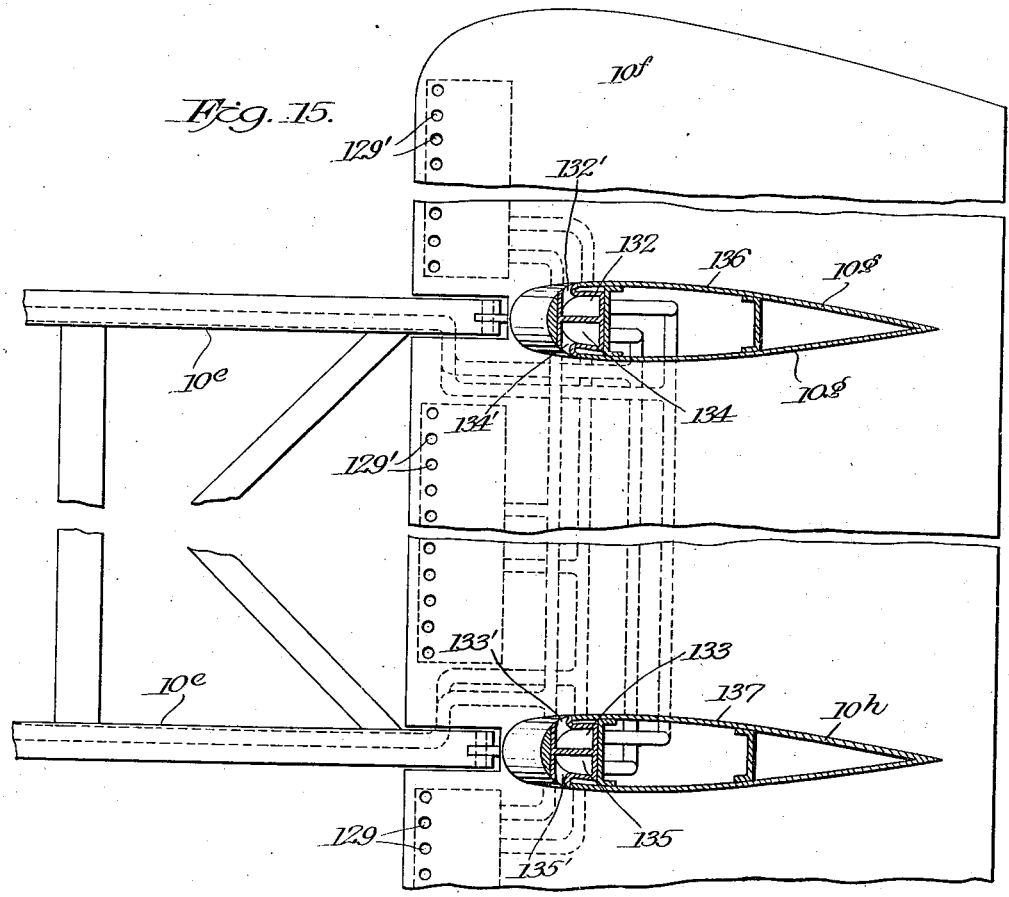
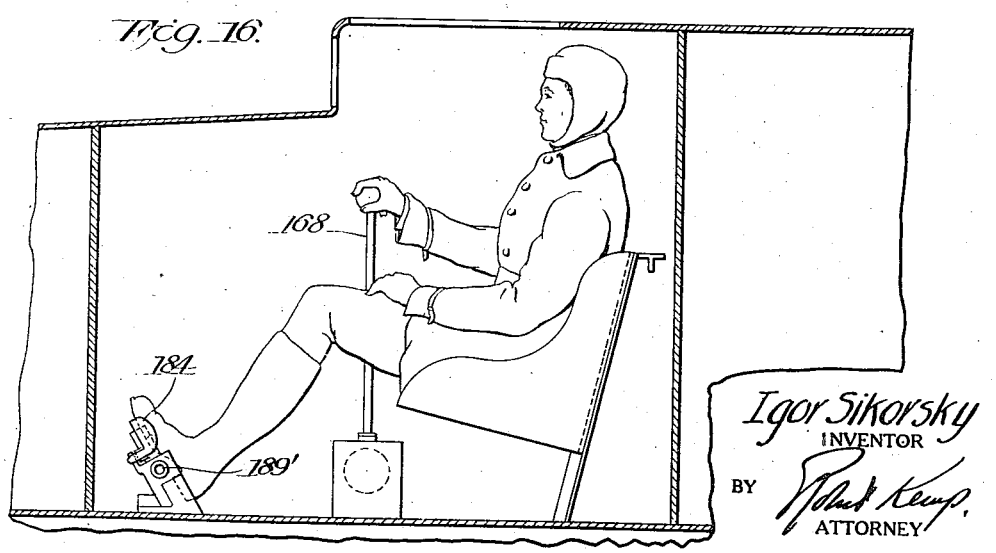

Sept. 27, 1932.   I. SIKORSKY   1,879,717
PNEUMATICALLY OPERATED AND CONTROLLED AIRCRAFT
Filed June 15, 1929   11 Sheets-Sheet 7
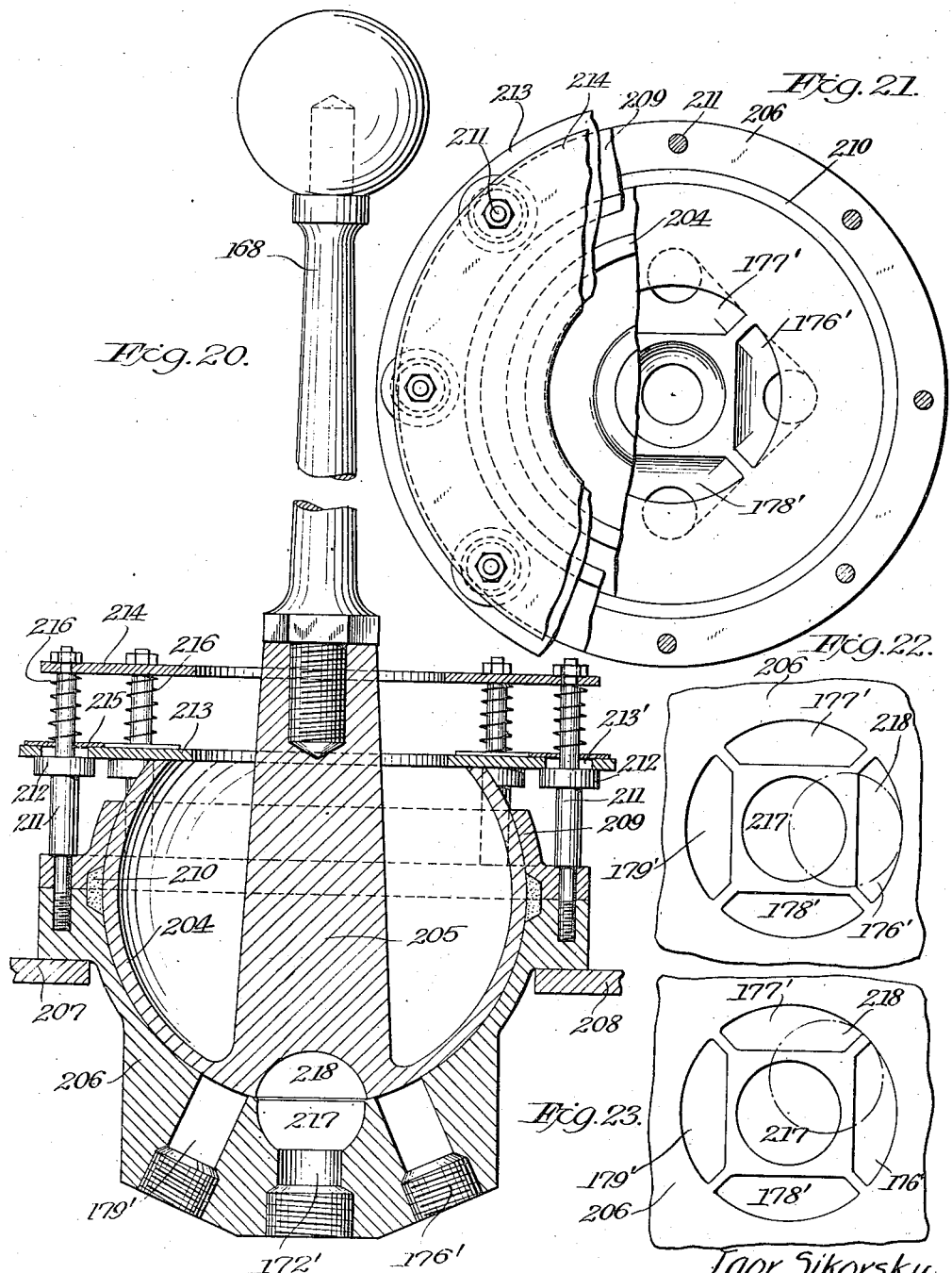

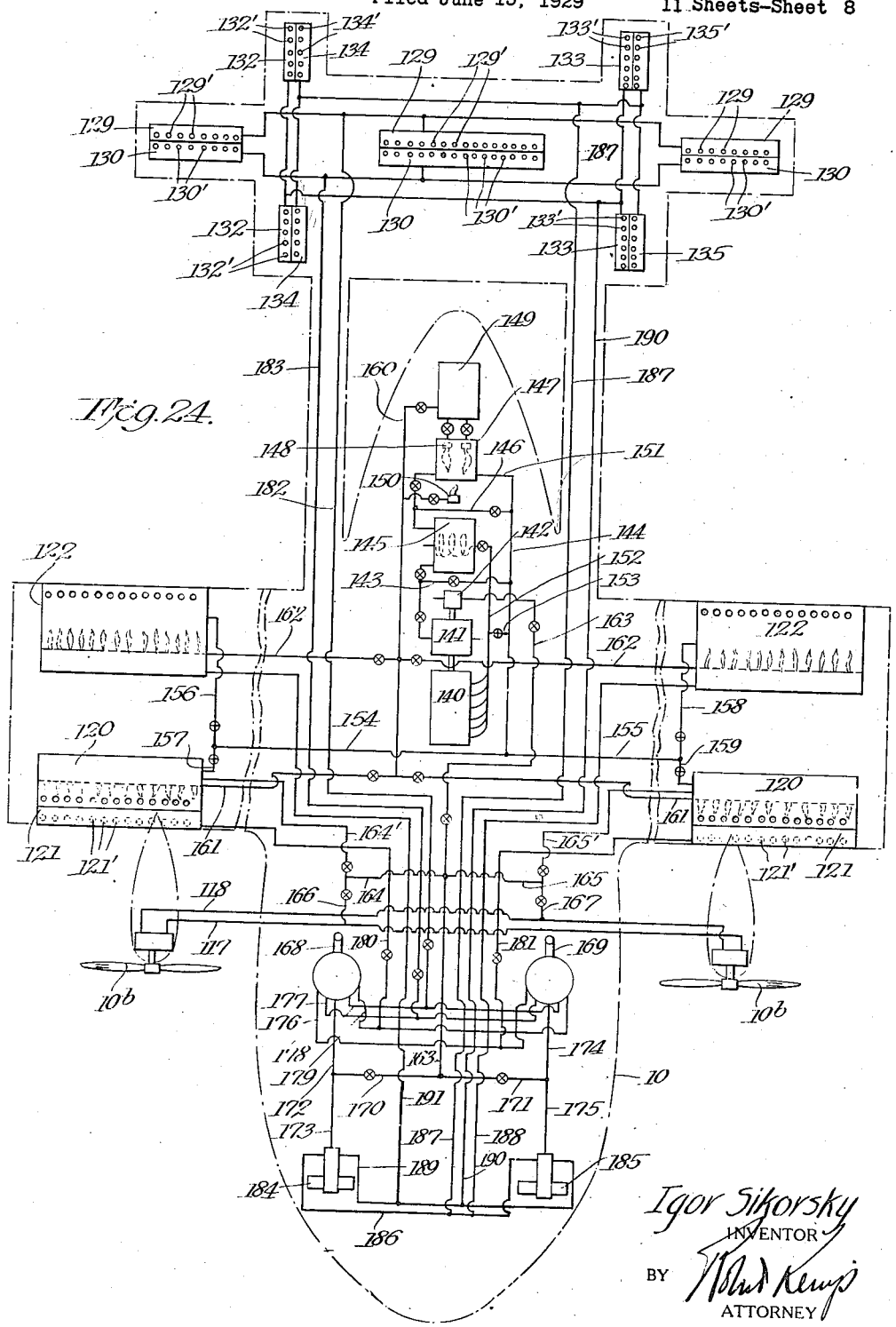

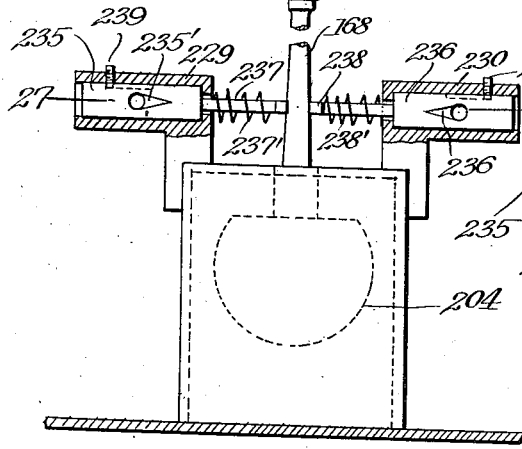
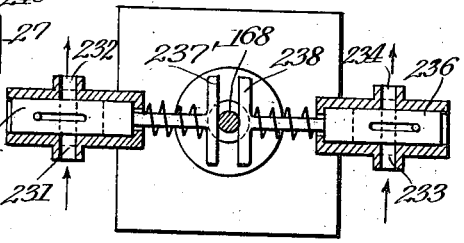
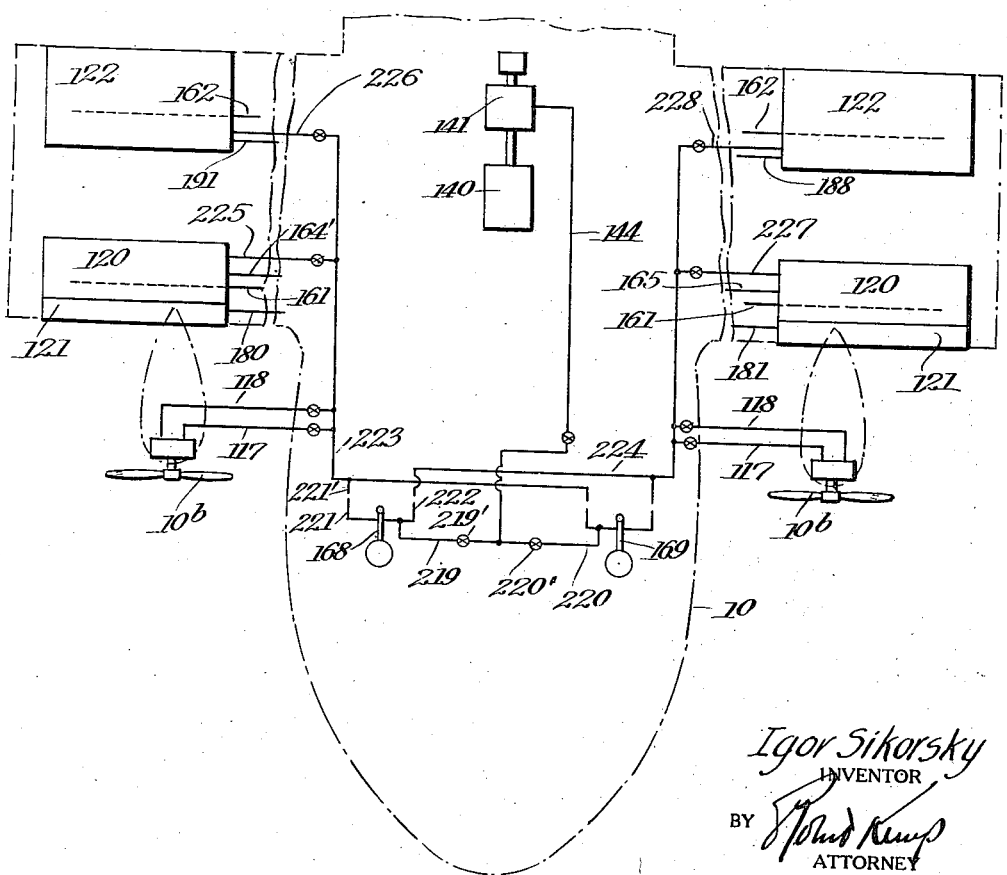

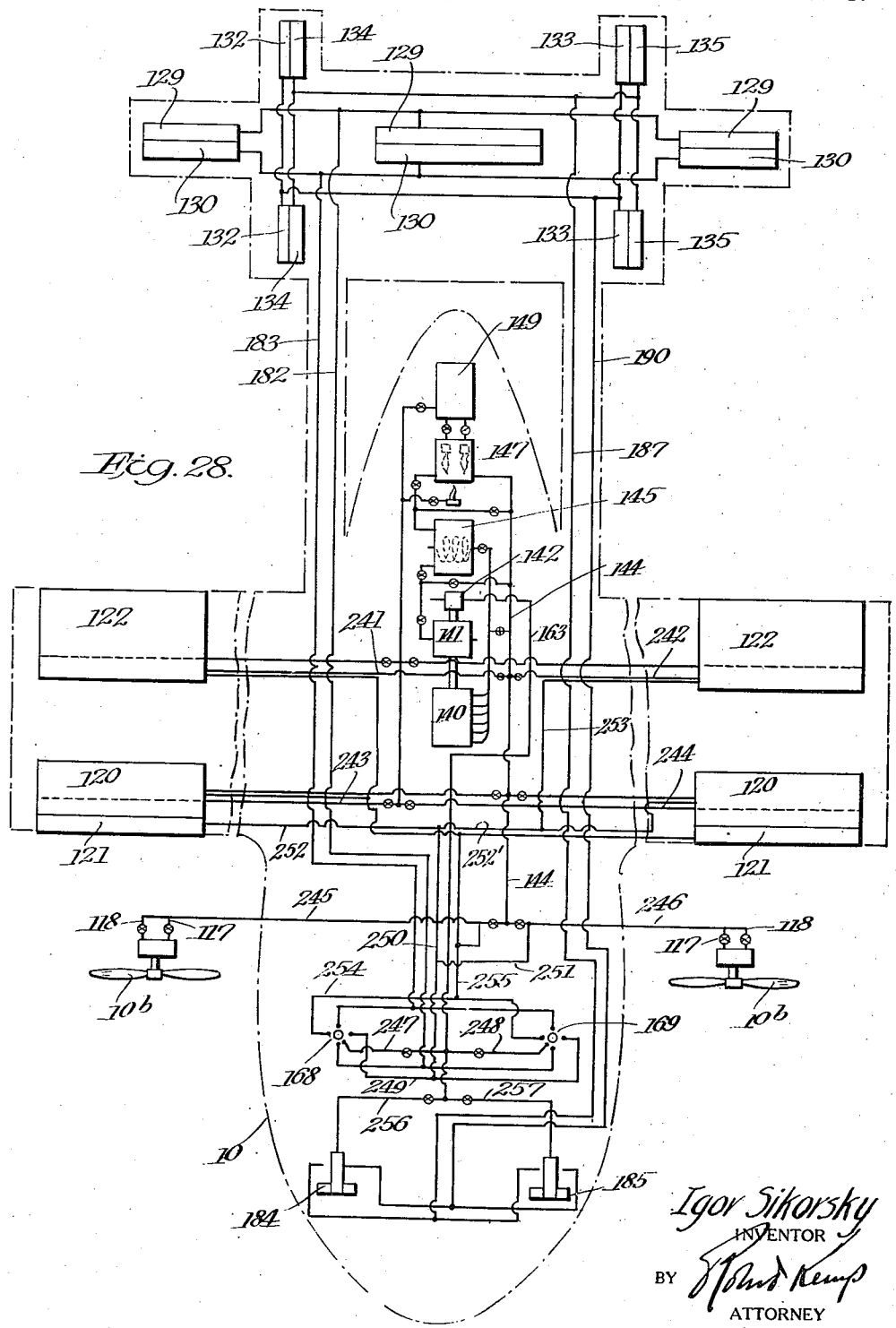

Sept. 27, 1932.  I. SIKORSKY  1,879,717
PNEUMATICALLY OPERATED AND CONTROLLED AIRCRAFT
Filed June 15, 1929  11 Sheets-Sheet 11
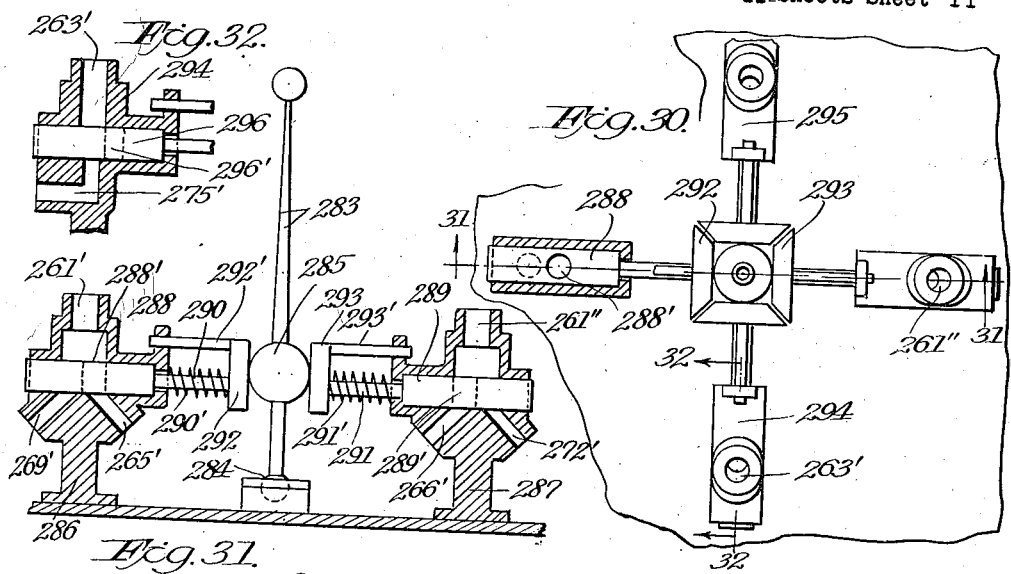

Patented Sept. 27, 1932

1,879,717

UNITED STATES PATENT OFFICE

IGOR SIKORSKY, OF COLLEGE POINT, NEW YORK, ASSIGNOR TO SIKORSKY AVIATION CORPORATION, OF WILMINGTON, DELAWARE, A CORPORATION OF DELAWARE

PNEUMATICALLY OPERATED AND CONTROLLED AIRCRAFT

Application filed June 15, 1929. Serial No. 371,138.

The present invention relates to propulsion and controlling systems for aircraft and has particular reference to a pneumatic system whereby the forward movement of the aircraft is effected and likewise all of its maneuvering movements.

While the invention relates to aircraft of all kinds, it is of particular value when applied to land-water-air-machines, commonly known as "amphibians" and consequently I shall describe the invention with reference to an amphibian of the multi-motor type.

The inherent structural characteristics of multi-motor amphibians are such as to give rise to large parasitic drag. According to the present invention small streamline mountings for the propellers are provided and replace the usual engine nacelles, thus greatly reducing the drag with proportionate benefit to the flying characteristics of the machine.

Further, according to the invention no movable exposed control means are provided so that there is no danger of the breakage or disabling of such elements due to high seas. There being no movable control elements, it follows that there are no exposed control cables so that there is no danger from breakage of the latter or disabling due to the formation of ice thereon.

I have indicated above that a pneumatic system is utilized. This system comprises essentially a prime mover, a blower driven thereby and reaction propellers, reaction jets on the supporting surfaces, lifting and vacuum destroying jets on the supporting surfaces and vacuum increasing jets on both sides of vertical and horizontal tail surfaces, the supply from the blower to the propeller and other jets being so controllable as to enable the aircraft to perform all the maneuvers capable of being performed with the usual movable ailerons and empennage members. The pressure medium used may be air or air mixed with other gases, such as the exhaust gases from an internal combustion engine which drives the blower. However, I do not limit myself with respect to the nature of the fluid medium which may be any such as may be convenient and practicable. For the sake of simplicity I shall refer herein to the pressure medium as air.

According to one preferred phase of the invention, the air which is supplied to the jet orifices is first of all mechanically placed under pressure by means of a positive action air pump or blower and during its subsequent passage to the orifices is expanded by the application of heat thereto with consequent increase in work capacity. The heating of the air may be accomplished in a number of different ways, some of which will be indicated hereinafter.

In addition to the mechanical advantages obtained by thus expanding the air, the discharged air serves the purpose of preventing the formation of ice on the aircraft lifting and control surfaces.

Without further enlargement on the general features of the invention, I shall proceed with a description thereof with reference to the embodiments shown in the accompanying drawings in which:

Figure 1 is an isometric perspective of an amphibian equipped with my improved propulsion and control means.

Figure 2 is a front elevation of the central portion of the machine of Figure 1.

Figure 3 is a section on line 3—3 of Figure 2.

Figure 4 is a back view, partly in section, of a reaction propeller.

Figure 5 is a section on line 5—5 of Figure 4.

Figure 6 is an enlarged view of a fragment of the propeller back.

Figure 7 is a section on line 7—7 of Figure 7.

Figure 8 is an elevation of the propeller boss.

Figure 9 is a longitudinal section through a transfer box for the fluid pressure medium.

Figure 10 is a partial section along line 10—10 of Figure 9.

Figure 11 is a partial section along line 11—11 of Figure 9.

Figure 12 is a section on line 12—12 of Figure 1.

Figure 13 is a diagrammatic fragmentary view of one form of heating means for the compressed air.

Figure 14 is a fragmentary plan view of the tail assembly including a section on line 14—14 of Figure 1.

Figure 15 is a lower plan view of the structure shown in Figure 14, parts being shown in section on line 15—15.

Figure 16 is a vertical longitudinal section through the pilots' compartment of the aircraft.

Figure 17 is an elevation of a foot control device.

Figure 18 is a section on line 18—18 of Figure 17.

Figure 19 is a section on line 19—19 of Figure 18.

Figure 20 is a vertical section of a stick control ball and socket valve.

Figure 21 is a broken plan view of Figure 20.

Figures 22 and 23 are developed views of the control orifices of the valve shown in Figure 2.

Figure 24 is a diagram showing the general layout of a complete system according to the present invention.

Figure 25 is a diagram showing a modification of Figure 24.

Figure 26 is an elevation partly in section of a control stick according to Figure 20, modified for use with the system shown in Figure 25.

Figure 27 is a section on line 27—27 of Figure 26.

Figure 28 is a diagram showing a modified form of control system.

Figure 29 is a diagram showing still another control system.

Figure 30 is a plan view partly in section of a stick control adapted to be used with the layout of Figure 29.

Figure 31 is a section on line 31—31 of Figure 30.

Figure 32 is a section on line 32—32 of Figure 30, and

Figure 33 is a diagram of an alternate power plant arrangement.

The general design of my preferred form of amphibian is clearly shown in Figure 1. According to this Figure, 10 indicates a body-boat positioned below and centrally of a main upper wing 11. Lower wings 12 spring laterally from the body-boat beneath the upper wings and are secured to the latter through a suitable strut arrangement such as is indicated. Pontoons 10a are supported beneath the outer ends of lower wings 12 and propellers 10b are mounted forwardly of streamline housings 10c which are rigidly mounted beneath main plane 11 in symmetrical relation to the body-boat. As will appear hereinafter, housings 10c contain transfer boxes for the fluid pressure medium.

A power plant positioned within the body-boat is indicated at 10d, the supply pipes therefrom being lead upwardly to the main plane through a vertical streamline conduit 26.

Outriggers 10e extend rearwardly of the main plane center section and adjacent their outer ends are suitably braced and connected with the rear end of the body-boat. At their extremities, the outriggers support a stabilizer 10f and vertical fins 10g and 10h, each preferably projecting both above and below the stabilizer.

It will be noted that the supporting planes as well as the control surfaces are of rigid construction throughout, that is to say, are provided with no control flaps as is the usual practice. These members are, however, otherwise modified as will appear hereinafter.

The amphibian has as an essential part thereof retractible landing wheels 15 which may be most clearly seen in Figures 1 to 3. These wheels may be moved from the operative position shown to an inoperative position in which they lie in horizontal planes immediately beneath lower planes 12.

Referring particularly to Figures 2 and 3, it will be seen that the wheel axles 17 are supported on brackets 16 pivotally connected to the body 10 at points 17' for movement about normally substantially horizontal axes. The outer ends of axles 17 are pivotally connected to rods 18 guided in tubular members 19 which in turn are pivoted at their upper ends to appropriate frame structure immediately to the rear of the propellers. Rods 18 are provided interiorly of tubular members 19 with piston heads which are adapted to be suitably influenced to move the wheels from operative to inoperative position or vice versa.

According to the illustrated arrangement, hydraulic pressure is employed for this motive function, the particular fluid medium preferably being oil, glycerine or the like. A supply of the pressure medium is contained in a tank 20 and a conduit 21 leads from the tank to a pressure generating device 22 which is controlled by means of a lever 23. The lines to and from pressure generator 22 are indicated at 25 and 25a and lead to distributor 24 disposed within convenient reach of the pilot in the pilots' compartment 30. Distributor 24 is connected to tubular members 19 by means of pipes 19a and 19b, the former debouching into the tubular members above the upper limit of travel of the piston heads associated with rods 18, and the latter debouching into said members below the lower limit of travel of the piston heads. Distributor 24 is suitably provided with valves so that fluid may be supplied at will to one or both of conduits 19a, or to one or both of conduits 19b so that the wheels 15 may be correspondingly raised or lowered. Conduits 19a and 19b are housed in the above mentioned vertical member 26 and in lateral branches 26a and 26b thereof.

The fluid medium, in addition to acting as an operating agent, has the function of serving as cushioning means when the machine is landed on its wheels. A tail skid is mounted at 10k, Figure 1.

This arrangement of parts for transforming flying machines from land craft to water craft and vice versa, has been more fully described in my prior applications Ser. Nos. 314,585 and 354,552.

It will be noted that the pilot's compartment 30 is provided with two chairs 38 placed side by side. Since the arrangement of this compartment and the control devices therein have been particularly described in my above named applications, it will suffice here to state that the reference numerals 61 indicate the engine control levers, 33 indicates levers cooperating with segments 35 to adjust the seats to various heights and retain them in adjusted position, 62 indicates controls operable to vary the angle of stabilizer 10f, and 168 designates control sticks, one in front of each chair 38.

In Figure 4, propeller 10b is shown as comprising blades 70 and 71 and boss 72. The leading edge of each blade is provided with a longitudinal passage as indicated at 73 and 74, these passages being joined by an arcuate recess 75 surrounding the propeller hub 76. Each blade has also a longitudinally extending passage adjacent its following edge, as at 77 and 78, these passages being connected by an arcuate recess 79 similar to recess 75. For a distance adjacent the blade tips, discharge orifices 80 and 81 are formed, these communicating with passages 78 and 74 respectively.

As particularly shown in Figure 5, the propeller back is stepped downwardly toward its following edge, there being two steps determining respectively the position of orifices 81 and 80.

Referring to Figure 7, the hub 76 is provided with an aperture 82 communicating with recess 79. Aperture 82 likewise registers with an aperture 83 formed in the wall of a hollow shaft 84 (see also Figure 9) to the end of which the propeller hub is keyed. A tube 85, Figures 7 and 9, is supported concentrically of the bore 84' of shaft 84 and is closed at its front end, Figure 7, by means of a cap 86 having an aperture 87 in register with aperture 83. The rear end of tube 85, Figure 9, is provided with a circumferential flange for the purpose of maintaining the tube in concentric relation to bore 84', the rear end of tube 85 seating against washer 88.

The propeller hub is secured to the end of shaft 84 by means of a cap screw 89 cooperating with threads formed in the end of bore 84'. Cap screw 89 is provided with a threaded axial bore in which engages cap screw 90 which abuts with its inner end cap 86 to hold the latter and therewith tube 85 in proper position. A nut 91 serves to lock cap screw 90 in adjusted position.

The end of shaft 84 remote from the propeller, is provided with an expanded head 92 extending within transfer box 93, Figure 9. Transfer box 93 comprises a hollow cylindrical member 94 supporting at its end adjacent the propeller a shouldered ring 95, which latter and shaft 84 receive between them members 96 and 97 of a ball bearing assembly constituting a journal bearing for the propeller shaft, members 96 and 97 being respectively held in position by means of rings 98 and 99.

The adjacent vertical faces of ring 95 and head 92 support members 100 and 101 of a ball bearing assembly which constitutes the thrust bearing for the propeller shaft. Ring 95 is rigidly secured to casing 94 by means of screws such as shown at 95'. The rear face of head 92 is provided with an annular recess 103 concentric with bore 84'. This recess communicates by means of an annular passage 104 with bore 84' forward of the flnaged head of tube 85. A fitting 105 has a face adapted to contact with the rear face of head 92, this member being provided with a circumferential flange circumscribing the rear margin of head 92 and cooperating with ring 106 to form a packing gland. Member 105 is provided with a bore 105' into which a central tubular extension of head 92 projects, and a packing gland 107 is provided to effect a tight fit between the extension and bore 105'. Member 105 is provided with a rearward tubular extension 108 concentric with a reduced continuation of bore 105', and also with an eccentric rearward extension 109 provided with a bore which communicates with an annular recess 110 registering with recess 103. Extensions 108 and 109 pass through closely fitting apertures in a wall 111 secured within casing 94 by means of screws such as shown at 111', the casing tapering off rearward of wall 111. Rotation of fitting 105 about extension 108 is prevented by the eccentric extension 109, although axial movement of the fitting relative to wall 111 is permitted. A spring 112 yielding urges fitting 105 against head 92.

In practice, the interior of casing 94 will be filled with oil, the contacting faces of members 92 and 105 receiving lubricant through ducts 114 and 115. The escape of the oil from the forward end of the casing is prevented by a gasket 116. Air under pressure is supplied to the hollow stem 108 through a preferably flexible tube 117 which leads from an air pump disposed in the body-boat. The air thus supplied passes through head 92, tube 85, apertures 87, 83, 82, recess 79 and passages 77 and 78 to discharge orifices 80. Air conducted to tubular extension 109 through pipe 118 flows into the registering annular recesses 110 and 103, passage 104, bore 84', an aperture 119 in shaft 84, an aperture 120 in hub 76, recess 75, and passages 73 and 74 to discharge orifices 81.

Air thus supplied to the propeller is released through orifices 80 as reaction jets to cause rotation of the propeller. Air released through orifices 81 forms jets having likewise a driving function, but whose particular purpose is to increase the vacuum existing at the propeller back whereby the pull of the propeller is considerably increased at any given speed.

The transfer boxes 93, as has been mentioned above, are disposed in streamline housings 10c. Pipes 117 and 118 are led to the transfer boxes through the streamline conduits 26, 26a and 26b.

In Figure 12, 119 indicates the main wing covering. In the nose portion of the main wing are disposed boxes 120 (see also Figure 1), these boxes having at their upper forward portions a series of spouts 120' projecting through the wing covering in a rearwardly direction. Immediately forward and below boxes 120 are disposed boxes 121 substantially coextensive therewith. Boxes 121 have a series of spouts 121' along their forward edge penetrating the wing covering and directed somewhat downwardly, the spout orifices lying below the horizontal medial line of the nose of the plane. In the trailing edge of plane 11 are disposed boxes 122 adjacent each end of the plane, these boxes having at the extremity of their rearward tapering portions spouts 122' terminating at the trailing edge of the plane.

Compressed air is adapted to be supplied to box 120 through aperture 123, to box 121, through aperture 124 and to box 122 through aperture 125. As shown in Figure 12, a burner 126 extends longitudinally of box 120 in advance of inlet aperture 123, the burner being supplied with gas from a suitable source, the gas being ignitible by means of an electric ignition device such as is illustrated diagrammatically in Figure 13 at 127. In this manner the air fed to box 120 may be heated during its passage through the box by direct contact with the flame issuing from burner 126. The air passing through box 121 is heated through conduction by the same flame, the air boxes being of light metal. A burner 128, similar to 126 is shown in box 122 disposed rearwardly of inlet 125.

The air jets issuing from orifices 122' which are disposed in the trailing edge of the main plane tend, by reaction, to move the plane and therewith the entire aircraft structure in a forward direction, to which motive effort the traction of the propellers may be added. If the air is cut off from box 122 at the right, but continues to be fed to box 122 at the left, or if more air is fed to box 122 at the left than to the one at the right, plane 11 and therewith the rest of the machine will be caused to turn to the right about the central vertical axis of the machine.

If air is equally supplied to boxes 120 at the right and left, the negative pressure existing above the right and left hand wings will be equally increased. If, however, more air is supplied to the left hand box 120 than to the one at the right, the negative pressure over the left hand wing will be correspondingly increased causing the machine to bank to the right. This movement may be accelerated by introducing air under pressure to the right hand box 121, the jets emerging from orifices 121' acting to diminish the degree of negative pressure normally existing above the right hand wing. What may be termed reaction propulsion jets issue from orifices 122', lifting jets from orifices 120' and vacuum destroying jets from orifices 121'.

The tail surfaces are particularly shown in Figures 14 and 15 to which reference will now be had. As will be seen from these figures, stabilizer 10f has in its nose portions upper and lower boxes 129 and 130 having a series of spouts 129' and 130' penetrating the stabilizer covering 131, the former spouts being directed upwardly and rearwardly and the latter downwardly and rearwardly. Orifices 129' are shown in the plan view of Figure 15, and it will be understood that orifices 130' have a similar arrangement below the nose tip of the stabilizer. Air jets emerging from orifices 129' will increase the negative pressure existing above the stabilizer whereby the latter will be lifted and the aircraft as a whole nosed downwardly. Conversely, jets emerging from orifices 130' will increase the negative pressure existing beneath the stabilizer causing the latter to drop and the machine to nose upwardly. Thus horizontal movements of the machine are controlled entirely by the differential effect of the upper and lower jets. The vertical tail surfaces or fins 10g and 10h having right hand boxes 132 and 133 respectively and left hand boxes 134 and 135 vertically positioned in their nose portions. Boxes 132 and 133 respectively have laterally directed spouts 132' and 133', while boxes 134 and 135 have spouts 134' and 135', all the spouts presenting discharge orifices flush with the fin coverings 136 and 137. The arrangement of orifices 134' is clearly indicated in the side elevation of fin 10g, Figure 14, and it will be understood that orifices 132' are similarly positioned on the other side of the same.

Jets simultaneously emerging through orifices 132' and 133' will increase the vacuum existing to the right of the fins causing the latter to move to the right whereby the machine as a whole is steered to the left. Conversely, jets emerging from orifices 134' and 135' increase the negative pressure to the left of the fins and cause the aircraft to steer to the right. It is thus evident that longitudinal directional movements are controlled by the differential pressure caused to exist at the sides of the vertical fins, although as has been indicated above, horizontal directional movement may also be controlled by the differential propulsion effort exerted laterally of the longitudinal axis of the machine.

It is believed that the above explanations make clear the principles underlying the present system of control. It is obvious that in order to secure the described differential effects, special distributing means for the compressed air and control means therefor, are necessary. According to the present invention, these means include separate control valves operable respectively manually or by means of a foot bar.

In Figure 24 the entire system is shown diagramatically, the arrangement of air lines shown in this figure being likewise indicated in Figure 1. In Figure 24, 140 indicates an internal combustion engine driving a large positive action pressure pump or blower 141 and a smaller blower 142. The air from the large blower may be passed through line 143 directly into main supply line 144 or by proper manipulation of the illustrated valves may be passed through heat exchanger 145 through line 146 to line 144. Again, by proper manipulation of valves the air may be passed from heat exchanger 145 into chamber 147 into direct contact with flames issuing from burners 148 supplied from gas generator 149, the latter being of any suitable design. Chamber 147 may also be heated by the externally disposed burner 150 and the chambers connected into line 144 through a branch 151. The heating element of heat exchanger 145 is adapted to be placed in connection with engine exhaust line 152, although by proper manipulation of the illustrated valves the exhaust may be diverted through connection 153 directly into line 144.

Line 144 terminates in branch lines 154 and 155, the former of which branches into lines 156 and 157 adapted to feed the right wing propulsion and lifting jets, while line 155 is adapted to feed lines 158 and 159 which supply the left wing propulsion and lifting jets. Burners 126 and 128 are supplied through a line 160 leading from the gas generator into branch lines 161 and 162.

A line 163 leads forwardly from blower 142 into branches 164 and 165 which through controllable branches 164' and 165' and adapted to supply additional air to the lifting jets of the right and left hand wings. Branches 166 and 167 are adapted to supply air to the propeller lines 117 and 118 respectively.

The provisions thus far described make no allowance for differential air supply to the air boxes of the two wings. Differential supply to the vacuum destroying boxes is, however, controllable through the stick controls indicated at 168 and 169.

It will be noted that line 163 terminates at its forward end in branches 170 and 171 adapted to feed further branches 172, 173 and 174, 175 respectively. Branch 172 leads to control stick 168 and through a valve, to be hereinafter described, may be diverted into line 176, 177, 178 or 179. Since the control sticks are identical and are alternately operable, it will suffice to point out the connections controlled by stick 168.

If a right hand turn is to be made, control stick 168 will be thrown to the right thereby connecting branch 172 with line 179. The latter line is in connection with line 180 which leads to the orifices 121' of the vacuum destroying box of the right hand wing, thereby causing depression of the right wing. Movement of the stick 168 to the left connects branch 172 with line 176 and thence through line 181 to the vacuum destroying orifices 121' of the left hand wing, thereby causing depression of the latter.

Movement of the stick 168 in a forward direction connects branch 172 with branch 178 which through line 182 leads to the upper vacuum increasing orifices 129' of the stabilizer so that the machine will be nosed downwardly. If stick 168 is pulled rearwardly, branch 172 will be placed in connection with line 177 which through line 183 leads to the lower vacuum increasing jets 130' of the stabilizer, thereby causing the machine to nose upwardly.

As will be evident from the description of the control stick to be given hereinafter, movement of the stick in a diagonal direction will cause the appropriate vacuum destroying boxes and stabilizer boxes to be affected.

Right and left hand foot bars are indicated at 184 and 185, these bars being duplicates and alternatively operable. Pressure on the right hand side of bar 184 will connect branch 173 with line 186 which through branch 187 leads through further branch connections to the left hand vacuum destroying orifices 134' and 135', thus causing the machine to turn to the right. Further, air from branch 186 will be led through line 188 to the left hand propulsion jets thereby increasing their effect as over the right hand jets and thus assisting in turning movement.

Pressure at the left on bar 184 throws branch 173 into branch 189 which throw line 190 feeds the right hand vacuum increasing orifices 132' and 133' thus steering the machine to the left. Air is also supplied through line 191 to the right wing propulsion jets to aid in the turning movement.

Foot bar 184 is illustrated in Figures 17, 18 and 19 and comprises a base member 192 having a central vertical tubular column 193 and heel rests 194 and 195. A conical valve seat is formed in the upper part of column 193 and has fitted therein a mating valve plug 196 having a stem 197 passing through an inwardly projecting radial flange 193' of the pedestal. The plug is held in position by means of a nut 198 screwed to the stem beneath flange 193'. The plug 196 has an upwardly extending integral arm 196' secured to bar 184. Stem 197 and plug 196 have an axial bore communicating with a horizontally extending slot 199 on the rear side of plug 196.

Air is admitted below stem 197 from branch 173 through an aperture 173' in the pedestal wall, a plug 200 blocking the passage therebelow. The upper end of the pedestal is provided with diagrammatically opposite bores 186' and 189' in which are inserted and secured the ends of branches 186 and 189. It will be obvious that movement of bar 184 to the right from the illustrated neutral position will connect inlet 173' with outlet 186' through the hollow valve stem and plug and slot 199, while movement of the bar to the left will similarly connect inlet 173' with outlet 189' with the results above described. The bar is ordinarily yieldingly held in neutral position by means of spring plates 201 and 202 secured to extension 196' and cooperating with an arm 203 integral with column 193 and extending between the plates. Control stick 168 is particularly shown in Figures 20 to 23. A truncated hollow sphere or ball 204 has a diametrically extending stem 205 projecting outwardly and centrally of its open end and has secured to its extremity stick 168. At its lower end the ball rests in a spherical seat formed in a base block 206, the latter being secured to supporting members 207 and 208 a convenient distance in front of the pilot's seat. A flange ring 209 of spherical internal contours is secured to block 206 in register with the hemispherical seat formed in the latter, thereby securing ball 204 against displacement. A gasket 210 is compressed between the ring and block, the latter elements being secured together by means of pedestal bolts 211. Bolts 211 support on their shoulders 212, an annular plate 213, and on their upper shouldered ends a second annular plate 214. Plate 213 is provided with relatively large apertures 213' through which the upper portions of bolts 211 pass so that the plate may be tilted relative to the bolts. A washer plate 215 lies on top of plate 213 and interposed between the washer plate and plate 214 are compression springs 216. Free movement of stem 205 is permitted in the cut-outs of plates 213 and 214 by the lower spring pressed plate 213, whose margins rest on the upper edges of ball 204 and tend to maintain the stick in vertical or neutral position.

Block 206 at its lower center is provided with an inlet opening 172' in which the end of branch 172 is secured. Opening 172' opening at its upper extremity into a hemispherical enlargement 217 which is normally in register with a hemispherical recess in the bottom wall of ball 204. Bores 176' and 179' open into the ball seat laterally of recess 217, their orifices being shaped as is indicated in the developed views of Figures 22 and 23. Branch 179 is in connection with bore 179' and branch 176 with bore 176'. Openings similar to lateral openings 176' and 179' are arranged fore and aft of recess 217 these being indicated at 177' and 178' and being connected with lines 177 and 178 respectively. All of the described openings are in symmetrical relation to recess 217, as is clearly indicated.

Movement of stick 167 to the left connects inlet passage 172' through enlargement 217 and recess 218 with outlet passage 176' with the result described in connection with Figure 24.

A diagonal movement of the stick as is indicated in Figure 23, connects inlet passage 172' with outlet passages 176' and 177' with a result which will be understood if reference is had to the description of Figure 24.

Figure 25 is a modified arrangement of part of the connections illustrated in Figure 24. It will be recalled that according to that figure the out-put of the large blower is led directly to the propulsion and lifting jets of the wings, the supply to the boxes of each wing being equal. According to Figure 25 the propellers are also supplied from blower 141, the right and left hand propulsion and lifting units normally receiving equal supplies of compressed air. However, according to Figure 25, if it is desired for example to turn to the right, the air supply is cut off from the right hand propeller, wing propulsion jets and lifting jets in proportion to the movement of the stick.

According to Figure 25, line 144 from the main blower terminates in supply lines 219 and 220, the former, through mechanism to be presently described, being controlled by stick 168 and the latter by stick 169. If stick 168, as will be assumed, is being used, valve 220' will be closed and valve 219' will be open. Line 219 terminates in branches 221 and 222 which normally discharge into lines 223 and 224. Line 223 supplies the right hand propeller through lines 117 and 118, the right hand lifting box through branch 225 and the right hand wing propulsion box through branch 226. Movement of stick 168 to the right has no effect on the flow from branch 222 to branch 224 so that the left hand propeller will be continuously supplied through lines 117 and 118, the left hand vacuum increasing box through branch 227 and the left wing propulsion box through line 228. Such movement to the right, however, gradually breaks the connection between branch 221 and line 223 so that the supply to the right hand propulsion and lifting elements is gradually diminished and may be entirely cut off with consequent greater pressure in line 224. Such operation of the stick would result in a right hand turning movement of the machine and in depression of the right wing, such depression also being assisted in the manner described in connection with Figure 24, and the turning movement being assisted or additionally controlled by means of foot bar 184. It will be understood that movement of the stick to the left will have the opposite effect.

According to Figures 26 and 27, the same stick 168 and ball and socket valve is shown as has been described with reference to Figures 20 to 24. In addition, however, two laterally extending and aligned horizontal slide valve boxes 229 and 230 are mounted adjacent stick 168. These boxes have respectively an inlet 231 in connection with branch 121, an outlet 232 in connection with branch 221' which joins line 223, an inlet 233 in connection with branch 222 and an outlet 234 in connection with line 224. Slides 235 and 236 are arranged in the guide boxes and have stems 237 and 238 projecting in the direction of the stick and provided with T-heads 237' and 238' which extend in parallel relation at each side of the stick and in substantial abutment with the latter. The valve slides are yieldingly retained in the position illustrated by means of compression springs 237' and 238'. These slides have apertures of substantially triangular shape 235' and 236' with their large ends normally in register with the slide box inlet and outlet openings. Screws 239 and 240 cooperate with elongated recesses in the top faces of the slides to limit the movement of the latter.

From the described arrangement it will be seen that movement of stick 168 to the right (the direction being taken relative to the showing of Figure 25) slide 235 will be moved out of register with inlet and outlet openings 231 and 232 so that the supply to line 223 will be gradually shut off and the supply to line 224 will be correspondingly increased, slide 236 remaining stationary. The effect of this maneuver will be readily understood from the above description of the diagram shown in Figure 25, it being understood that the ball and socket valve also functions with the effects described with reference to Figure 24.

The diagram of Figure 28 illustrates an arrangement which may be substituted as a whole for that of Figure 24. In this diagram 140 again designates the internal combustion engine, 141 the large blower, 142 the small blower, 145 the heat exchanger, 147 the heating chamber and 144 the line leading forwardly from the large blower. In this figure again, line 144 continuously feeds the right and left hand propulsion boxes and the right and left hand lifting boxes through branches 241, 242 and 243, 244 respectively. In this instance, however, line 144 also supplies the propeller lines 117 and 118 through branches 245 and 246. Stick and foot controls identically the same as those used in the system of Figure 24 are employed in this modification and are designated at 168, 169, 184 and 185. Main line 163 from the small blower leads to branches 247 and 248 which are the supply lines associated with sticks 168 and 169 respectively.

Movement of stick 168 to the right connects line 247 with line 249 which through line 250 and branch 251 supplies additional air to the left hand propeller thus increasing its speed. At the same time branch 252 which leads from line 250 supplies air to the right wing vacuum destroying jets, also simultaneously additional air is supplied from line 250 through branch 252' and connection 253 to the left wing propulsion jets and lifting jets.

Thus, according to the system just described, air is continuously supplied from the main blower equally to the right and left hand propellers, propulsion jets and lifting jets and upon movement of the stick to the right additional air will be supplied to the left hand propeller, wing propulsion jets and lifting jets, while simultaneously air is supplied to the right wing vacuum destroying jets. This means that the machine will be turned about its central vertical axis, while simultaneously the right wing is depressed.

Movement of stick 168 to the left connects supply line 247 with lines 254 and 255, branches leading from the latter to the right hand propeller, the left wing vacuum destroying jets and the right wing lifting and propulsion jets so that the opposite effect follows to that which is secured when the stick is moved to the right.

In this diagram, movement of stick 168 forwardly or rearwardly has exactly the same effect as that shown and described in connection with Figure 24 and the foot bar connections are also identical, it being understood that line 163 from the small blower terminates in lines 256 and 257 leading to the foot controls. Also the gas generator 149 and its connections are the same as illustrated in Figure 24.

Figure 29 illustrates an arrangement which may be substituted as a whole for any of those above described. According to this system, a single blower may be connected with a single supply line 258. Branches 259 and 260 lead from line 258 to the lateral control mechanisms 261 and 262 which are stick controlled, but of different design than as described in connection with Figures 24 and 28. Branches 259 and 260 likewise lead to the fore and aft stick control mechanism indicated at 263 and 264. One stick controls both the lateral and vertical movements of the aircraft, although two are provided for alternative use. It will be assumed in the following description that the right hand stick is in use and under these circumstances valve 260' will be closed and valve 259' open.

With the right hand stick in neutral position, air will pass through connection 261 into lines 265 and 266, the former leading to the right hand propeller lines 117 and 118 and to the lifting and propulsion jets of the right wing through line 267. Branch 266 connects into a line 268 which feeds the left hand propeller lines 117 and 118 and the lifting and propulsion boxes of the left wing. If the stick is moved to the right, connection 261 still feeds line 266 from its one end, but at its other end its feed is transferred gradually from line 265 to line 269. Line 269 has a branch 270 leading to the right wing vacuum destroying jets and terminates in a line 271 leading to the left hand vacuum increasing jets of the vertical tail members. The result is that the right wing is depressed and the machine is turned due to the differential propulsion forces existing at the right and left hand sides of its longitudinal axis and to the action of the vertical tail surfaces which are moved to the left. If the right hand stick is moved to the left, connection 261 feeds branch 265 uninterruptedly from its other end, but its feed to branch 266 is transferred to line 272 which feeds the left wing vacuum destroying jets and through a branch 273 is connected into a line 274 which feeds the right hand vacuum increasing jets of the vertical tail surfaces. The effect is the reverse of that described in connection with the right hand movement of the stick.

From the above it will be observed that lateral movement of the control stick effects not only the propellers and main plane appliances, but also the vertical tail surfaces.

Movement of the stick forwardly connects the forward end of connection 263 with a line 275 which is connected through a line 276 to the upper vacuum increasing jets of the stabilizer, thus causing the machine to nose downwardly. If the stick is moved rearwardly, air flows from connection 263 into line 277 and thence into line 278 which leads to the lower vacuum increasing jets of the stabilizer thus causing the machine to nose upwardly.

Line 258 terminates forwardly in branches 279 and 280 which lead to the foot bars 184 and 185 previously described. Pressure on the right of bar 184 connects line 279 with line 281 leading to line 271 which, as above mentioned, supplies the left hand vacuum increasing jets of the vertical tail members causing them to move to the left and thus steering the machine to the right. Pressure on the left side of bar 184 connects branch 279 with a line 282 which in turn is in connection with line 274 leading to the right hand vacuum increasing jets of the vertical tail surfaces.

The machine is universally controllable directionally through manipulation of the control sticks and this control may be assisted or modified through appropriate operation of the foot bars.

Figures 30 to 32 illustrate a stick control usable in the system described with reference to Figure 29.

The control stick 283 is supported at its lower end by means of a ball and socket joint generally indicated at 284, and upwardly of this supporting means a spherical member 285 is rigidly secured to the stick. Laterally of the stick are a pair of pedestals 286 and 287 in whose upper expanded ends are formed slide valve boxes in which are reciprocable horizontal slides 288 and 289 provided with perforations 288' and 289' respectively. The two ends of connection 261, Figure 29, communicate with bores 261' and 261" extending vertically above slides 288 and 289 and adapted to register with the apertures of the latter throughout their extent of movement. A bore 265' at the lower side of the box is in connection with line 265 and normally in connection with bore 261' through aperture 288' of slide 288. Bore 269' formed in the base of the valve box registers with a portion of bore 261', but its communication therewith is normally cut off by an imperforate portion of the slide. In the same manner, bore 261" is normally in connection with a bore 266' leading to line 266, while a normally upwardly closed bore 272' leads to line 272.

Stems 290 and 291 are secured to the opposed ends of slides 288 and 289 and support on their free ends plates 292 and 293 at diagrammatically opposite sides of sphere 285 and substantially in contact therewith. Springs 290' and 291' are interposed between plates 292 and 293, and their respective valve boxes. Guide rods 292' and 293' extend rearwardly from heads or plates 292 and 293 and are guided in apertures in upstanding end flanges of the boxes.

If stick 283 is moved to the right (as established in Figure 29) spring 290' will be compressed and aperture 288' of slide 288 moved away from bore 265' and over bore 269' with the result which has been described above. This movement will not effect slide 289 whose forward end will be held in abutment with the end wall of its associated box by means of spring 291'.

Valve boxes 294 and 295 are located fore and aft of stick 283 and have the same general arrangement of slides, stems, heads, guides and springs as above described. Valve 295 is identical in arrangement with 294 which latter is shown in section in Figure 32. Valve slide 296 has a perforation 296' normally out of register with upper and lower bores 263' and 275' formed in the box body. Movement of the stick 283 in a forward direction moves perforation 296' into register with bores 263' and 275' thus permitting air to flow from connection 263 to line 275 with the result above described. Movement of the stick rearwardly will leave slide 296 unaffected but will move the slide in valve box 295 so that air will flow from connection 263 to line 277. Diagonal movement of the stick will cause proportionate movement of adjacent slide valves thus producing a composite effect.

In Figure 33 I have shown a power plant comprising a pair of internal combustion engines 297 and 298, each adapted to drive a positive action pump or blower, these latter being designated at 299 and 300. The air from the two blowers may be led directly into propeller lines 117 and 118, these lines only, for the sake of simplicity being shown in this diagram. By a suitable manipulation of the illustrated valves, however, the air from the blowers may be diverted into lines 301 and 302 which lead through heat exchanges 303 and 304, through which are also led the exhaust lines 305, 306 of the engines, to a common expansion chamber or reservoir 307 and thence through lines 308 and 309 to the propeller lines. If it is desired, heating chambers 310 and 311 may be interposed in lines 308. It will also be apparent that by appropriate manipulation of valves 312 and 313, air from only one of the blowers may be lead into chamber 307 and thence to both of the propeller lines.

While I have described the various phases of my invention with some particularity, it will be understood that I do not limit myself except as determined in the following claims, since various changes may be made in details and arrangement of parts without departing from the spirit of the invention.

I claim:

1. A method of controlling aircraft which includes pneumatically advancing one end portion of a wing or supporting surface while simultaneously pneumatically retarding the other end portion of said surface.

2. A method of depressing an aircraft wing which comprises issuing a jet of air from the front of said wing in the same direction in which the wing is travelling.

3. A method of turning aircraft which comprises increasing pneumatically the atmospheric pressure on one side of a tail surface of the aircraft and simultaneously creating a propulsion differential along the trailing edge of a supporting surface of the aircraft.

4. In aircraft the combination comprising supporting surface, a body connected to said supporting surface, reaction propulsion jets adjacent the trailing edge of said supporting surface on each side of said body, lifting jets adjacent the leading edge of said supporting surface on each side of said body, vacuum jets positioned adjacent the leading edge of said supporting surface on each side of said body, and means for controlling the operation of said jets.

5. An aerofoil having reaction jets adjacent its trailing edge and lift-destroying jets adjacent its leading edge.

6. In an aircraft supporting or control surface, a forwardly directed pneumatic jet means adjacent the leading edge of said surface for destroying the lifting power of said surface.

7. A supporting or control surface for aircraft having controllable a forwardly directed pneumatic jet means adjacent its leading edge for destroying the lifting power of said surface.

8. In an aircraft, an aerofoil having rearwardly faced pneumatic jet orifices adjacent its trailing edge, means for supplying air under pressure to said orifices, and pneumatic interconnected control means for effecting a differential supply of air to the orifices adjacent the opposite ends of said aerofoil whereby to turn the aerofoil about its central vertical axis.

9. In an aircraft, an aerofoil having forwardly faced orifices at its leading edge, and means for supplying air under pressure to said orifices for impairing the lift of said aerofoil.

10. In an aircraft, an aerofoil having forwardly faced orifices at its leading edge, and means for supplying air under pressure to said orifices for impairing the lift of said aerofoil, said means including a hollow member disposed in the nose portion of the aerofoil.

11. In an aircraft, an aerofoil having forwardly faced orifices at its leading edge, means for supplying air under pressure to said orifices for impairing the lift of said aerofoil, and means for effecting a differential supply to the orifices adjacent the opposite ends of said aerofoil to vary the relative lift at said ends.

12. In an aircraft, an aerofoil, a pair of horizontally spaced propellers symmetrically disposed relative to the aerofoil, means for driving the propellers, pneumatic reaction jet means for effecting horizontal turning movements of the aircraft, control means for said reaction jet turning means, and means controlled by said control means for governing the propeller driving means whereby the propellers may be driven at different relative speeds to participate with said reaction jet turning means in turning the aircraft.

13. In an aircraft, an aerofoil, a pair of horizontally spaced reaction driven propellers symmetrically disposed relative to the aerofoil, means for supplying air under pressure to said reaction jet driven propellers, and a single control means for effecting differential air supply to said propellers.

14. In an aircraft, a horizontal control surface, a series of orifices on each side of said control surface adjacent the leading edge thereof, a source of air supply, means for heating said air, separate air supply lines between said source and the orifices on the opposite sides of said control surface, valve means adapted to selectively connect said source with said air lines, and a single control lever for said valve means.

15. In an aircraft, a vertical control surface, a series of orifices on each side of said control surface adjacent the leading edge thereof, a source of air supply, means for heating said air, separate air supply lines between said source and the orifices on the opposite sides of said control surface, and valve means operable to selectively connect said source with said air lines.

16. In an aircraft, a vertical control surface, a series of orifices on each side of said control surface adjacent the leading edge thereof, a source of supply, separate supply lines between said source and the orifices on the opposite sides of said control surface, a plurality of independently operable valve means each adapted to selectively connect said source with said lines, a hand operated stick for actuating one of said valve means, and foot operated means for operating another of said valve means.

Signed at College point, in the county of Queens and State of New York this 21st day of December A. D. 1928.

IGOR SIKORSKY.